United States Patent Office 2,868,814
Patented Jan. 13, 1959

2,868,814

COMPOSITION OF MATTER

Avrom I. Medalia, Belmont, and Harold H. Freedman, Brookline, Mass., assignors to General Latex & Chemical Corporation, Cambridge, Mass., a corporation of Massachusetts No Drawing. Application November 2, 1953
Serial No. 389,870

5 Claims. (Cl. 260—413)

A class of compounds of considerable technical importance is that known variously as emulsifying agents, soaps, detergents, or surface-active agents. A typical representative of these compounds would have a molecular structure incorporating a hydrophobic group and a hydrophilic group. The former group could be, for example, a hydrocarbon radical of from 8 to 26 carbon atoms. The latter group could be, for example, —COOK, —$SO_3Na$, —$COOCH_2CH_2OCH_2CH_2OH$, etc. Thus, typical compounds include potassium laurate, sodium dodecyl sulfonate, diethylene glycol monostearate.

Another important class of compounds is that of the vinyl monomers. Typical representatives incorporate a vinyl group, $CH_2$=CH—, attached to an activating group, such as phenyl, chloro, cyano, vinyl, or other radicals. An activated vinyl group may be defined as a $CH_2$=C= group, where at least one of the disconnected valences is attached to an electronegative group which substantially increases the electrical dissymmetry or polar character of the molecule. Vinyl monomers can be polymerized by free-radical or ionic mechanisms, yielding polymers in which the molecular structure of the monomer is repeated many times. Thus, from styrene is formed polystyrene:

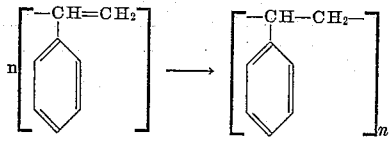

The present invention relates to the preparation of a class of compounds which function both as emulsifying agents and as vinyl monomers. The prior art is completely ignorant of the preparation of such compounds. These compounds have not hitherto been synthesized. This application describes the class, together with specific examples, of vinyl emulsifying agents.

As an example of such a vinyl emulsifying agent we may cite the compound, p-styrylundecanoic acid (potassium salt)

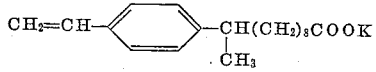

or

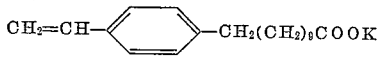

Infra-red analysis and C-methyl determinations have indicated that the product formed as described below is principally 10-p-styrylundecanoate rather than 11-p-styrylundecanoate.

The potassium salt of p-styryl undecanoic acid is prepared by subjecting methyl phenylundecanoate to the following successive steps: acetylation, reduction, dehydration and saponification. The methyl phenylundecanoate is prepared by the method of Fourneau and Baranger. (Bull. Soc. Chem. (4), 49, 1161 (1931).)

Acetylation of the methyl ester of phenylundecanoic acid (B. P. 136°/0.5 mm., $n_D^{25}$=1.4850) yields mainly methyl p-acetophenylundecanoate. An example is as follows: In a three-necked flask equipped with stirrer, reflux condenser and dropping funnel (protected from moisture) is placed 55 gms. (0.41 mole) of anhydrous aluminum chloride. To this is added 39 gms. (0.5 mole) of acetyl chloride and the mixture is refluxed for a few minutes on the steam bath with vigorous stirring. When the solid complex has formed and stirring is no longer possible, 100 cc. of carbon disulfide is added and the complex is dispersed by resuming the stirring. Fifty-five gms. (0.2 mole) of methylphenylundecanoate in 50 cc. of carbon disulfide is added by means of the dropping funnel at such a rate as to maintain a gentle refluxing of the mixture and a vigorous evolution of hydrogen chloride. The entire addition takes less than thirty minutes and the reaction mixture becomes yellow then dark red. It is stirred for about fifteen minutes after the final addition and is decomposed by pouring onto ice acidified with hydrochloric acid. The organic layer is separated, the aqueous layer is extracted with ether and the organic layers are washed twice with water and combined. The solvents are removed and the residue is distilled. The yield of methyl p-acetophenone undecanoate (B. P. 170°/0.5 mm. $n_D^{25}$=1.5028) is 52 gms. or 82% of theoretical.

The above ketone is reduced to the corresponding secondary phenethyl alcohol by allowing it to react with a three-fold excess of aluminum isopropoxide in dry isopropyl alcohol. The mixture is refluxed and distilled slowly until no more acetone is evolved (about three hours) as determined by testing the distillate with 2,4-dinitrophenylhydrazine reagent. The mixture is diluted with an equal volume of acidified water and the organic layer extracted with ether, washed, dried and the ether removed. The alcohol is not isolated but is dehydrated under the influence of potassium acid sulfate and heat to methyl-p-styryl-undecanoate. An example of the dehydration is as follows: To 30 grams of the alcohol (0.094 mole) is added 10% by weight of powdered anhydrous $KHSO_4$ and 1% of t-butyl catechol (as inhibitor). The mixture is heated under a high vacuum at 120–130° C. until all foaming ceases (about 30 minutes) and then is distilled. When larger amounts are to be distilled it may be necessary to utilize a "flash" type of distillation. The product is a colorless liquid which boils at 185–6°/2 mm. $n_D^{25}$=1.4987.

For many applications the distillation may be omitted; the crude product of the dehydration step can be saponified as described below, and the crude soap used as such. The methyl p-styrylundecanoate is saponified by dissolving in anhydrous methanolic KOH and refluxing gently for 30 minutes. The mixture is diluted with an equal volume of water, acidified with hydrochloric acid and extracted with ether. The ether is removed under vacuum, leaving p-styrylundecanoic acid from which the potassium salt may be readily prepared by reaction with potassium hydroxide.

Proof that the synthesis outlined above gives the expected products has been obtained chiefly by analysis of the methyl ester of p-styryl undecanoic acid, which is readily prepared in pure form. The saponification of this ester can be unquestionably assumed to yield the corresponding acid without structural change. The presumed structure of methyl-p-styrylundecanoate is confirmed by the following tests.

(a) The carbon-hydrogen analysis agrees with that predicted for the compound $C_{20}H_{30}O_2$: Calculated, C=79.4%, H=10.0%; found, C=79.1%, H=10.1%.

(b) Titration with bromine shows the presence of one double bond per unit of molecular weight 302.

(c) The saponification number agrees with the expected value of 302.

(d) The infrared spectrum shows the presence of a para mono-substituted benzene ring, a vinyl group and an ester group.

(e) The ultraviolet absorption spectrum indicates the presence of one styryl group per unit of molecular weight 302.

p-Styryl undecanoic acid is a colorless liquid which slowly polymerizes on standing in the presence of light and air to form a glassy solid. It can be stored at reduced temperatures even in the absence of inhibitor.

The nature of this product as an emulsifying or surface-active agent is shown by the following experiments. An aqueous solution of p-styryl undecanoic acid (potassium salt), in a concentration of 0.057%, has a surface tension of 43.0 dynes/cm. at 25° C. Dilute aqueous solutions foam on shaking. A solution of 0.2 g. of the potassium soap in 7 ml. of water was shaken with 4 ml. of toluene; an emulsion was formed which was stable for several hours; in contrast to an emulsion formed similarly with potassium myristate, which broke in less than two minutes.

The nature of this product as a vinyl monomer has been demonstrated, first, by its polymerization on standing, as mentioned above; second, by the formation of a poly-soap on heating an aqueous solution of the soap together with a catalyst (potassium persulfate).

As further illustration of vinyl emulsifying agents we may list compounds having the following structures:

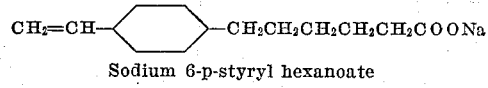

Sodium 6-p-styryl hexanoate

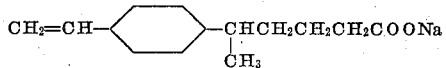

Sodium 5-p-styryl hexanoate

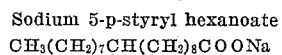

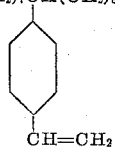

Sodium 10-p-styryl octadecanoate

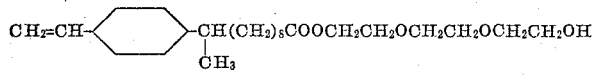

Triethylene glycolmono-10-(p-styryl)undecanoate

Compounds of the type set forth above have the general formula

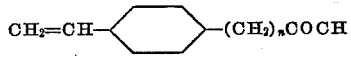

where $n$ can be from 4 to 16; or the structure

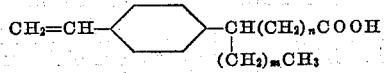

where $n$ can be from 4 to 12 and $m+n$ can be from 4 to 16.

The compounds of this type are by no means limited to those cited above, but others will suggest themselves to persons skilled in the art on the basis of the above disclosures.

Having thus described our invention, we claim the following:

1. Compounds of structure

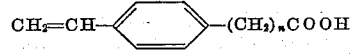

where $n$ can be from 4 to 16 and the salts and esters of such compounds.

2. Compounds of structure

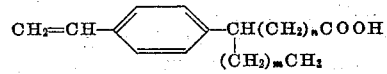

where $n$ can be from 4 to 12, and $m+n$ can be from 4 to 16 and the salts and esters of such compounds.

3. p-Styryl undecanoic acid and its salts.
4. Polyoxyethylene esters of p-styryl undecanoic acid.
5. The methyl ester of -p-styrylundecanoic acid.

References Cited in the file of this patent
UNITED STATES PATENTS

| 2,118,864 | Reppe et al. | May 31, 1938 |
| 2,341,060 | Price et al. | Feb. 8, 1944 |
| 2,384,119 | Muskat et al. | Sept. 4, 1945 |
| 2,384,124 | Muskat et al. | Sept. 4, 1945 |
| 2,526,108 | Arnold | Oct. 17, 1950 |
| 2,527,597 | Swern et al. | Oct. 31, 1950 |
| 2,541,126 | Swern et al. | Feb. 13, 1951 |

OTHER REFERENCES

Berichte, vol. 45, page 42 (1912).
Bellstein, Vierte Auflage, Band 9, page 645 (1926).
Richter's Org. Chemistry, 3rd edition, vol. II, page 348 (1939), Nordemann Publishing Co., New York.
Chem. Reviews, vol. 42, pages 172, 174 and 184 (1948).
J. Am. Chem. Soc., vol. 70, page 3673.